United States Patent
Small et al.

(10) Patent No.: US 7,949,338 B2
(45) Date of Patent: May 24, 2011

(54) SYSTEM FOR MANAGING A COMMUNICATION SYSTEM

(75) Inventors: David Small, Dublin, CA (US); Christina Quon, Hayward, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1219 days.

(21) Appl. No.: 11/561,943

(22) Filed: Nov. 21, 2006

(65) Prior Publication Data

US 2008/0119180 A1    May 22, 2008

(51) Int. Cl.
H04W 40/00 (2009.01)
H04L 12/28 (2006.01)
G06F 11/00 (2006.01)

(52) U.S. Cl. ......... 455/445; 370/229; 370/237; 370/351

(58) Field of Classification Search .......... 455/436–455; 370/336, 338, 351, 389, 400, 401
See application file for complete search history.

(56) References Cited

U.S. PATENT DOCUMENTS

| 7,408,881 | B2 * | 8/2008 | Acharya et al. | 370/238 |
| 2002/0034215 | A1 * | 3/2002 | Inoue et al. | 375/147 |
| 2002/0131434 | A1 | 9/2002 | Vukovic et al. | |
| 2005/0286425 | A1 * | 12/2005 | Nagesh et al. | 370/238 |

FOREIGN PATENT DOCUMENTS

WO    9508899 A1    3/1995

* cited by examiner

*Primary Examiner* — Matthew Sams
(74) *Attorney, Agent, or Firm* — Guntin Meles & Gust, PLC; Ed Guntin

(57) ABSTRACT

A system for managing a communication system is disclosed. A system that incorporates teachings of the present disclosure may include, for example, a network management system having a network configuration element that identifies for each of a plurality of wireless base terminals (WBTs) a resultant communication path to a mobile telephone switching office (MTSO) according to a plurality of performance characteristics and a delay injected into at least one of a plurality of alternative communication paths connecting combinations of the WBTs to the MTSO. Additional embodiments are disclosed.

19 Claims, 4 Drawing Sheets

300

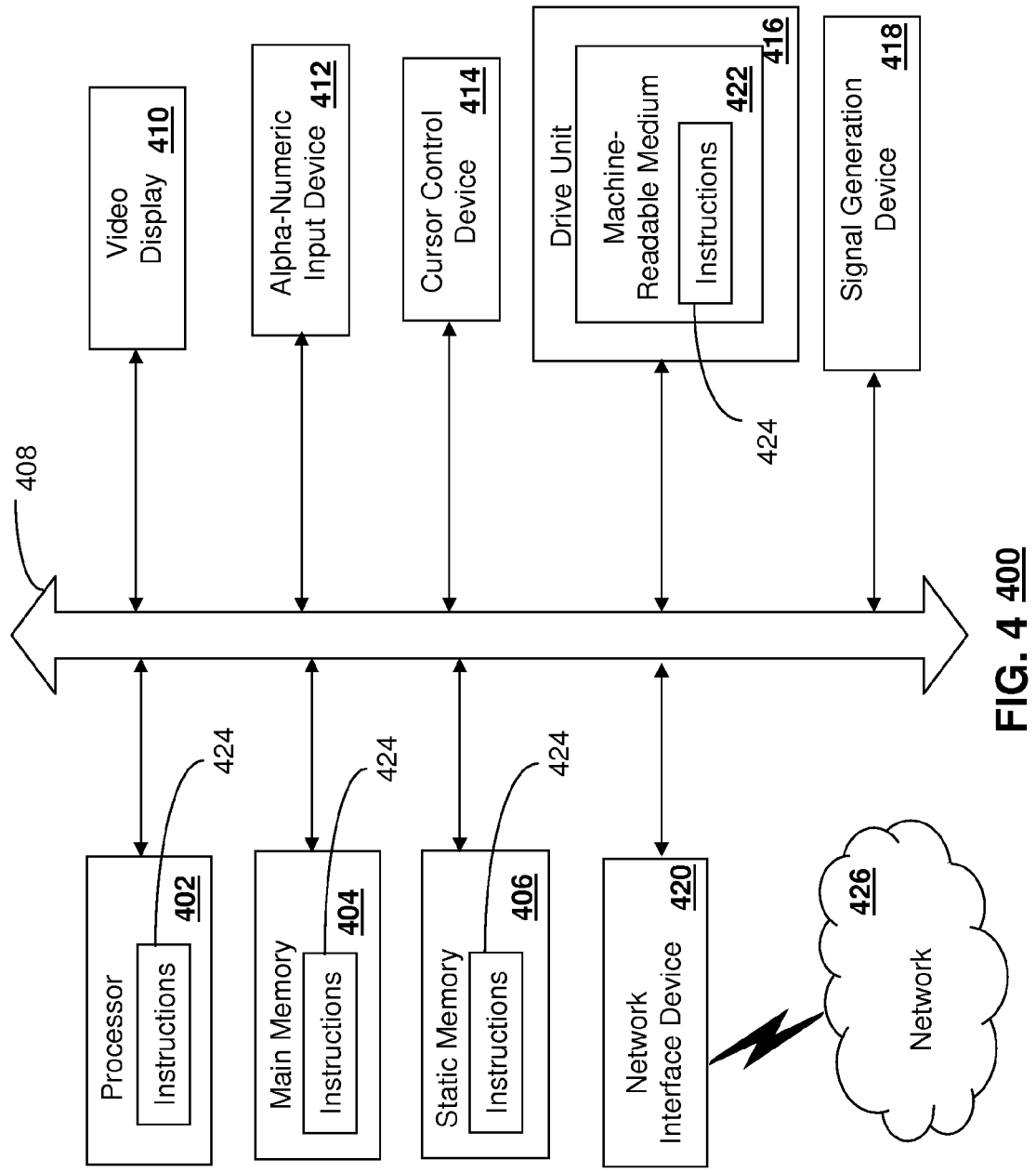

SYSTEM FOR MANAGING A COMMUNICATION SYSTEM

RELATED APPLICATIONS

U.S. patent application, filed Jun. 28, 2006, by Small et al., Ser. No. 11/427,135, entitled "Method and Apparatus for Improving Network Performance in a Communication System," is incorporated herein by reference in its entirety. U.S. patent application, filed Jun. 28, 2006, by Small et al., Ser. No. 11/427,142, entitled "Method and Apparatus for Maintaining Network Performance in a Communication System," is incorporated herein by reference in its entirety.

FIELD OF THE DISCLOSURE

The present disclosure relates generally to communication systems, and more specifically to a system for managing a communication system.

BACKGROUND

In a cellular system, wireless base terminals (WBTs) cover a wide geographic area utilizing frequency-reuse techniques. It is not uncommon for WBTs to have overlapping coverage areas to avoid null or dead spots that can cause dropped calls. In overlapping coverage areas it is possible for a mobile phone to submit a mobile origination call to a mobile telephone switching office (MTSO) by way of two or more WBTs.

In order for the MTSO to operate properly, mobile phone operators expect signals received by the MTSO to not exceed for example a maximum latency and/or maximum jitter distortion level. Furthermore, signals from multiple WBTs must arrive at the MTSO within a set time period in order to be identified as part of the same call stream. This time period is known as differential delay. Current mobile telephony backhaul networks are served by circuit-switched elements (e.g., T1 lines), which have very short delay tolerance. Differential delay is generally not an issue with backhaul lines consisting of only T1 lines.

As telephone companies reduce cost, increase features, and reliability, alternative backhaul technologies are being considered: Ethernet over Copper, Ethernet over Fiber, WiMAX, SONET, NG-SONET, and so on. With the growth of packet-switched (vs. circuit-switched) multi-hop backhaul, and the variability in packet delivery times, differential delay can become a significant problem for legacy MTSOs receiving WBT signals over packet-switched networks.

A need therefore arises for a system for managing a communication system.

BRIEF DESCRIPTION OF THE DRAWINGS

FIG. 4 depicts an exemplary diagrammatic representation of a machine in the form of a computer system within which a set of instructions, when executed, may cause the machine to perform any one or more of the methodologies disclosed herein.

DETAILED DESCRIPTION

Embodiments in accordance with the present disclosure provide a system for managing a communication system.

In a first embodiment of the present disclosure, a network management system can have a network configuration element that identifies for each of a plurality of wireless base terminals (WBTs) a resultant communication path to a mobile telephone switching office (MTSO) according to a plurality of performance characteristics and a delay injected into at least one of a plurality of alternative communication paths connecting combinations of the WBTs to the MTSO.

In a second embodiment of the present disclosure, a computer-readable storage medium in an Adjustable Delay Injector (ADI) can have computer instructions for applying a delay to data transported in a communication path established between a select one of a plurality of WBTs and an MTSO to satisfy a desired differential delay with another communication path established between another WBT and the MTSO.

In a third embodiment of the present disclosure, a network element can have a controller element that receives provisioning information for effectuating in whole or in part a resultant communication path to an MTSO, wherein the network element is integrated with or is coupled to an ADI that injects a delay in the resultant communication path, and wherein said resultant communication path is determined from a plurality of communication path alternatives between a plurality of WBTs and the MTSO that satisfy a desired differential delay threshold.

Figure 1:
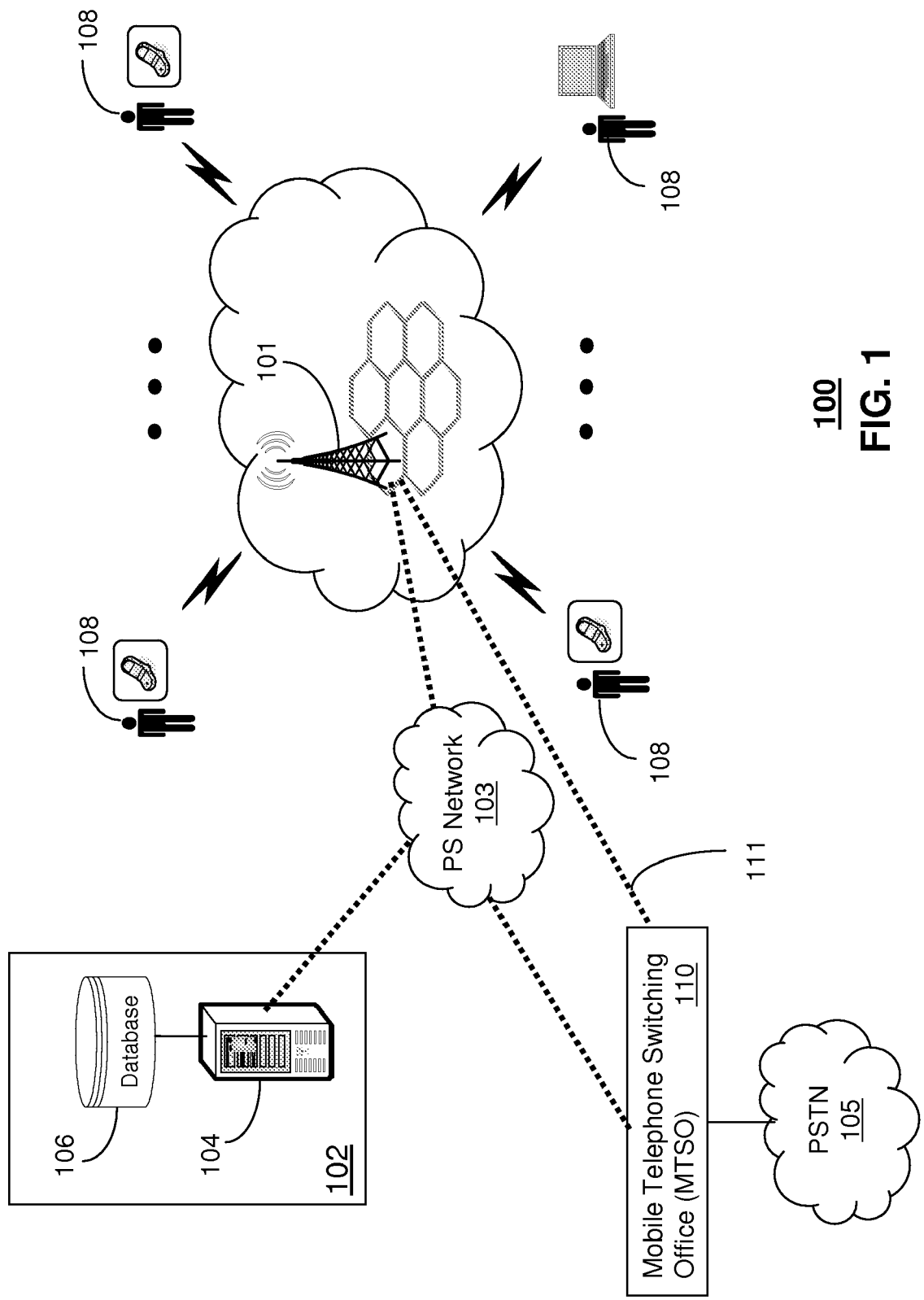
FIG. 1 depicts an exemplary embodiment of a communication system.

FIG. 1 depicts an exemplary embodiment of a communication system 100. The communication system 100 can comprise a plurality of wireless base terminals (WBTs) 101, also commonly referred to as base stations, distributed throughout a network under a frequency-reuse methodology for providing wireless services to roaming end users 108 over a large geographic region (such as a city, state or nation). The end users can use any wireless device capable of communicating with the WBTs 101 including without limitation mobile phones, cellular-capable PDAs, and computing devices such as laptops equipped with a cellular interface. Any current or next generation cellular communications technology can be applied to the WBTs 101 and end user devices 108 including without limitation GSM/GPRS, CDMA-1X, EVDO, UMTS, Software Defined Radio (SDR), WiMAX, and/or ultra wide band (UWB).

The WBTs 101 can relay mobile origination (MO) calls initiated by an end user device 108 to a mobile telephone switching office (MTSO) 110 by way of a packet-switched (PS) network 103 conforming to for example the Internet Protocol or more sophisticated protocols such as multi-protocol label switching (MPLS). Alternatively, MO calls can be communicated directly from the WBT 101 to the MTSO 110 by way of dedicated or leased lines such as a T1 line carrying data traffic. An MTSO 110 houses switches and computers to which WBTs 101 in an area are connected for the purpose of establishing end-to-end communications by way of the public switched telephone network (PSTN) 105 or the PS network 103 as the case may be. The MTSO 110 handles the connection, tracking, status and billing of all wireless call activity in an assigned area.

A network management system (NMS) 102 can be utilized for programming the PS network 103 so that a mobile origination call processed by more than one WBT 101 conforms to the operating characteristics of the MTSO 110. In particular the NMS 102 provisions network elements (such as routers) of the PS network 103 so that MTSO 110 requirements for differential delay, path delay and jitter are satisfied for combinations of WBTs 101 processing the same mobile origination call of a select wireless mobile device. To accomplish this, the NMS 102 can utilize a controller 104 and associated database 106 that stores network topology information of the communication system 100. The controller 104 utilizes common computing technology such as a scalable server to manage the operations of the network elements of the PS network 103.

Figure 2:
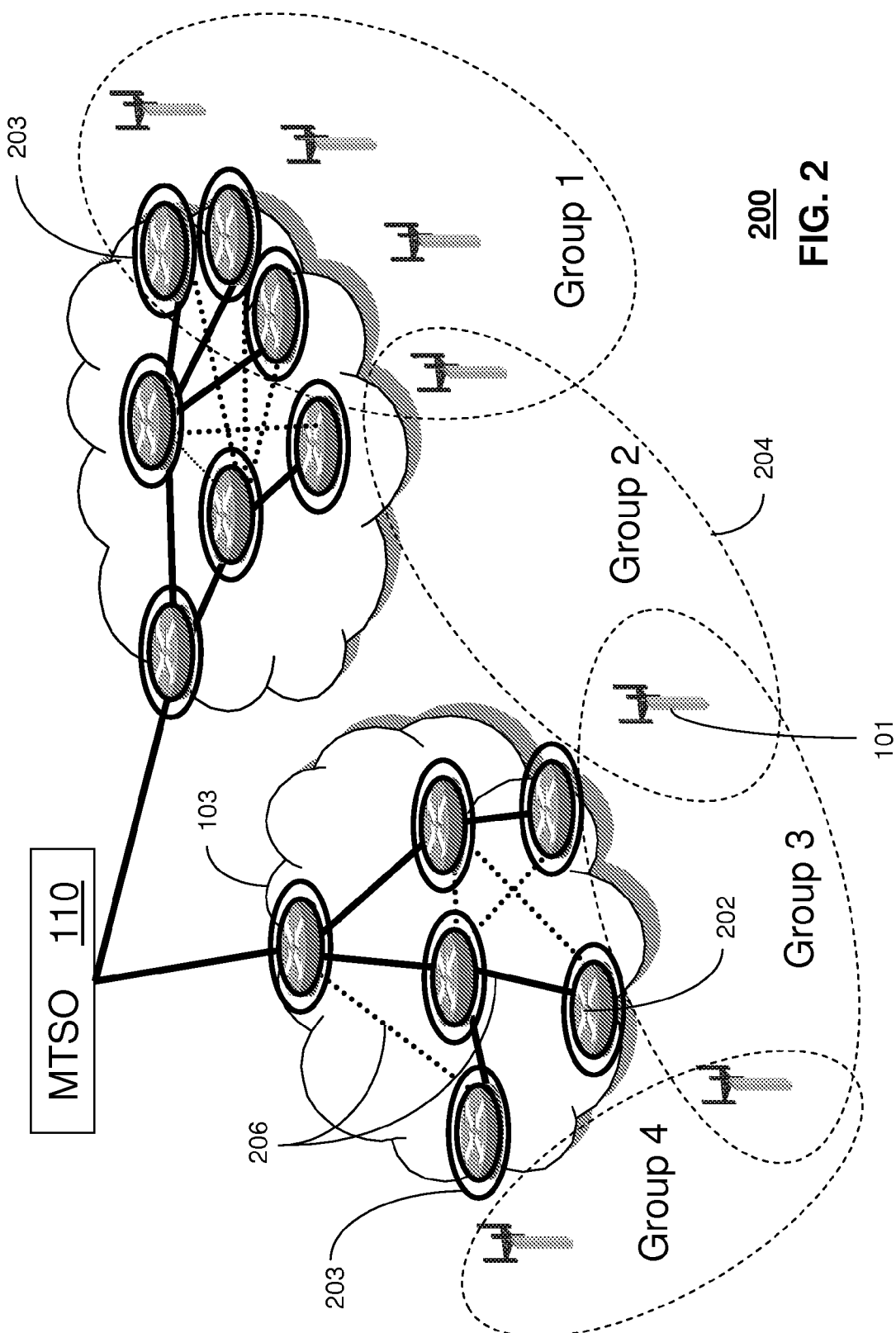
FIGS. 2-3 depict an exemplary method operating in the communication system.
Figure 3:
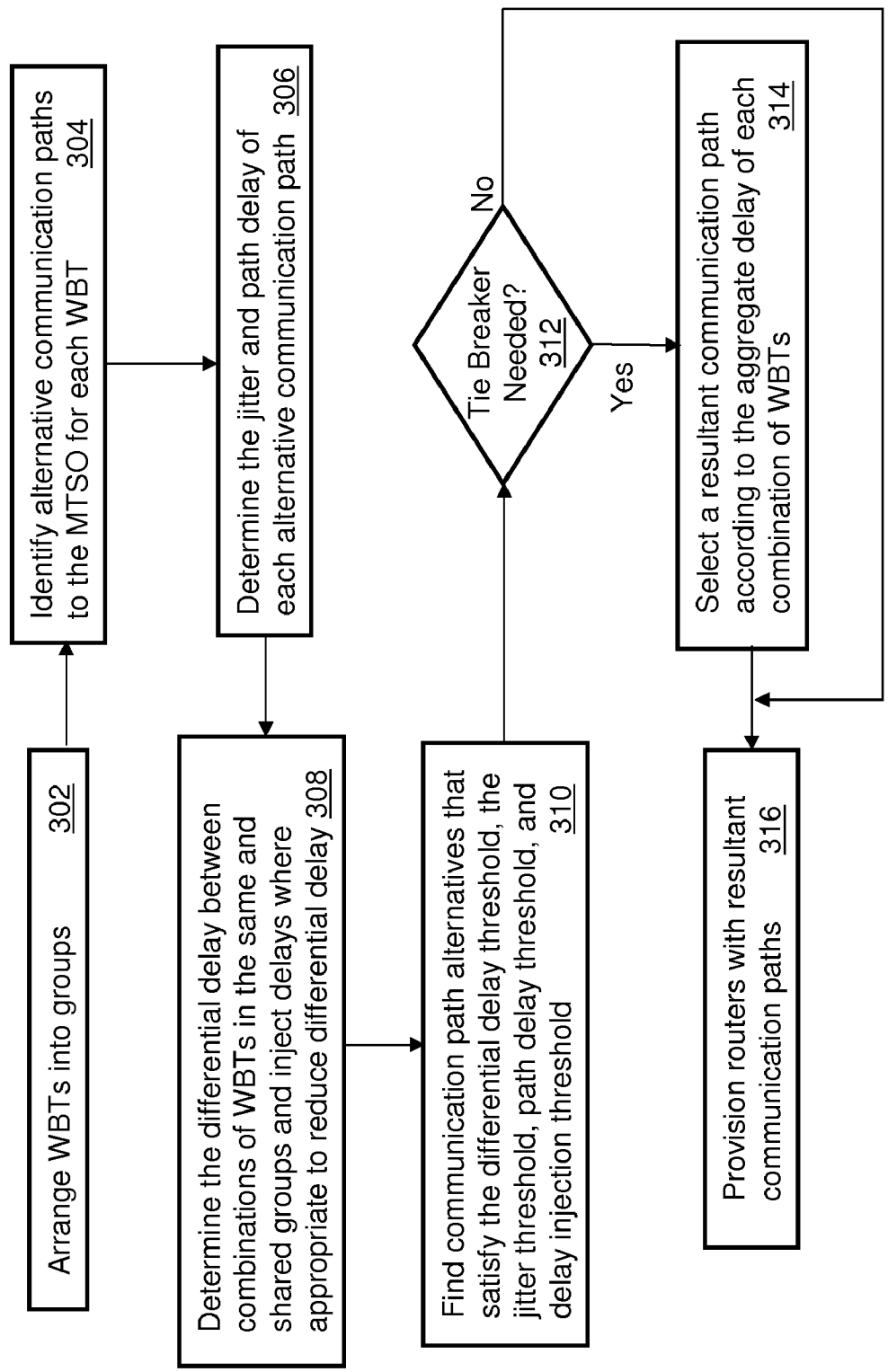

FIGS. 2-3 depict an exemplary method 300 operating in the communication system 100. FIG. 2 depicts a detailed view of the WBTs 101 coupled to the MTSO 110 by way of a number of network elements 202 (herein also referred to as routers 202 performing the function of packet-switched network elements). Each router 202 can be coupled (or integrated with) an Adjustable Delay Injector (ADI) 203 (see disk-shaped object surrounding a router symbol in FIG. 2). An ADI 203 can include a controller, a memory buffer, and a transceiver. The transceiver in part can include a communication port for processing provisioning information transmitted by the NMS 102 using, for example, a Simple Network Management Protocol (SNMP) over, for example, a high-speed broadband link.

The transceiver can further include common network interface cards that support a variety of packet communication streams (e.g., Gigabit Ethernet) transported by the router 202. With the use of the memory buffer, the ADI 203 can inject delays into ingress and egress packet streams flowing through links of a corresponding router 202 (herein a multi-port ADI). Alternatively, each ingress or egress data port of a router can have an ADI 203 coupled thereto. In this embodiment, an ADI 203 is associated with only one data port of a router 202 (herein a single-port ADI). It would be apparent therefore to one of ordinary skill in the art that the disk shape representing an ADI 203 in FIG. 2 can represent several single-port ADIs each capable of injecting a delay into a corresponding data link of a router 203, a multi-port ADI capable of injecting delays in each data link of a router, or a router having the integral function of the ADI. By way of a single-port ADI, multi-port ADI, or integrated ADI function in a router, the NMS 102 can, for example, inject a 5 millisecond delay in a Gigabit Ethernet stream transported by a router 202 by buffering said stream in a 625 Kbyte buffer.

The routers 202 at the edges of the PS network 103 are coupled to corresponding WBTs 101. Each WBT 101 is assigned to a single router 202. For purposes of the present illustration, the PS network 103 can be assumed to operate according to an MPLS protocol. Because of the dynamic nature of packet switching networks, there are many alternative communication paths 206 that can be chosen between a particular WBT 101 and the MTSO 110. The ad hoc nature of such networks can have an adverse effect on the MTSO 110 when combinations of WBTs 101 are serving the same mobile communication device 108. To be compliant with the MTSO 110 requirements for differential delay, path delay, and jitter, the NMS 102 can be programmed to provision the routers 202 and corresponding ADIs 203 according to method 300 as depicted in FIG. 3. By varying delays on one or more links entering or exiting a router 202 by way of an ADI 203, the NMS 102 can determine optimal paths between the WBTs 101 and the MTSO 110.

With this in mind, method 300 can begin with step 302 in which the NMS 102 can be programmed to arrange the WBTs 101 into groups 204 such as depicted in FIG. 2 with overlapping coverage areas having one or more shared WBTs therebetween. In step 304, the NMS 102 can be programmed to identify alternative communication paths to the MTSO 110 for each WBT 101. The alternative communication paths can be determined according to a number of common path determination algorithms. For example, up to K alternative communication paths (K being an integer) can be determined from a shortest path algorithm such as presented in an article entitled, "Finding the K Shortest Loopless Paths in a Network," authored by J. Y. Yen, published July 1971 by Management Science, pp. 712-716, the contents of which are expressly incorporated herein in its entirety. In view of the Yen algorithm, the solid and dotted links 206 between routers 202 can represent a number of shortest loopless alternative communication paths to the MTSO 110 for each of the WBTs 101 solved thereby.

Once a number of alternative communication paths to the MTSO 110 have been identified for each WBT 101, the NMS 102 can be programmed to proceed to step 306 where it calculates expected distortions such as jitter and path delay for each alternative communication path. Jitter is the variation in delay between packets. Knowing the path delays of each alternative communication path, the NMS 102 can proceed to step 308 where it determines the differential delay between combinations of WBTs 101 within a group and in shared groups 204. In the illustration of FIG. 2, each group has a shared WBT 101. Accordingly differential delays are calculated between WBTs 101 of group 4 according to combinations of alternative communication paths associated with these WBTs 101. The same calculations are applied to groups 3, 2 and 1.

The differential delays are determined by calculating the difference between path delays in alternative communication paths of combinations of WBTs 101 serving the same mobile communication device 108. The alternative communication paths can be packet switched paths of the PS network 103 and/or dedicated T-1 leased lines 111. In this same step 308, the NMS 102 can be programmed to inject delays into one or more of the alternative communication paths by way of the ADIs 203. The injected delays can be used to equalize and effectively reduce differential delay between pairs of the alternative communication paths.

In step 310, the NMS 102 can be programmed with common linear equation techniques to find communication path alternatives between the MTSO 110 and each WBT 101 that satisfy a differential delay threshold (e.g., less than or equal to 15 ms), a jitter threshold, path delay threshold (e.g., less than or equal to 25 ms), and a delay injection threshold (e.g., the path delay plus a desired injected delay must be less than the path delay threshold). Linear equations can be applied more than once in cases where there may be more than one solution for injecting delay into one or more paths by way of the ADIs 203. In situations in which WBTs 101 have more than one communication path solution to the MTSO 110 that satisfy the criteria of step 310, the NMS 102 can be programmed according to steps 312-314 which apply a tie-breaker algorithm. In step 314, the NMS 102 can be programmed to select a resultant communication path for each WBT 101 from a select one of the communication path alternatives having a lowest aggregate delay summed over the combinations of WBTs 101. If on the other hand, a single solution is found for more than one of the WBTs 101 of FIG. 2, then the NMS 102 can proceed from step 312 to step 316 where it provisions the routers 202 and ADIs 203 according to the resultant communication path for each of said WBTs 101.

Provisioning step 316 can represent for example the organization of label switched path links between the routers 202 in order to establish the resultant communication path for each WBT 101 to the MTSO 110, and the provisioning of associated ADIs 203 with delays that can be equal to or greater than zero seconds (zero seconds representing a passthrough state). Step 316 is depicted by the solid lines between each router 202 serving a WBT 101 at the edge of the PS network 103. The dotted lines represent alternative communication paths that did not satisfy one or more of the aforementioned criteria of steps 306-314.

In an exemplary embodiment, the following linear equations can be applied to method 300 to accomplish the results of FIG. 2 with more than one path between the WBTs 101 and corresponding edge routers 202.

$p_x^k$: 0 if the $k^{th}$ ($1 \leq k \leq K$) alternative communication path for WBTx is not selected, where WBTx belongs to all the WBTs 101 in a group 204.

$p_x^k$: 1 if the $k^{th}$ ($1 \leq k \leq K$) alternative communication path for WBTx is selected.

$d_x^k$ is the path delay of the $k^{th}$ ($1 \leq k \leq K$) alternative communication path for WBTx.

$j_x^k$ is the worst case jitter of the $k^{th}$ ($1 \leq k \leq K$) alternative communication path for WBTx.

$t_x^{k,l}$: 1 if the $k^{th}$ ($1 \leq k \leq K$) path for WBTx traverses link l; 0 otherwise (note $t_x^{k,l}$ is given, not calculated by the formula below).

T: an integer temp variable.

The objective is to minimize the aggregate delay among the alternatives of communication paths to the MTSO 110

$$W \times \left( \sum_x \sum_k p_x^k \times d_x^k \right) + T,$$

where W is a weighting factor, which the foregoing equation is subject to:

$p_{x_1}^{k_1} \times d_{x_1}^{k_1} - p_{x_2}^{k_2} \times d_{x_2}^{k_2} \leq A$, $k_1 \geq 1$, $k_2 \leq K$, $x_1 \neq x_2$ for WBTs 101 belonging to the same groups 204, wherein A is the differential delay threshold;

$p_x^k \times d_x^k \leq B$, wherein B is the path delay threshold;

$p_x^k \times j_x^k \leq C$, wherein C is the distortion threshold (e.g., jitter tolerance threshold);

$$\sum_k p_x^k = 1$$

only one resultant communication path can be selected for each WBT 101; and $$\sum_x \sum_k p_x^k \times t_x^{k,l} \leq T,$$

for each link l.

It should be evident from the above formulations that shared WBTs 101 create dependencies between shared groups 206 for calculating resultant communication paths. Thus in the illustration of FIG. 2, groups 1-4 require a holistic approach to determining resultant communication paths for the WBTs 101 in said groups. For example, the WBT 101 shared between groups 3-4 has an effect on resultant communications paths solved for groups 2 and 1, and vice-versa. It should also be evident that the foregoing equations can be applied a number of times when there is more than one solution for injecting delays into one or more communication paths of FIG. 2 to reduce differential delay.

Other algorithms suitable to the present disclosure can be used for identifying resultant communication paths between the MTSO 110 and WBTs 101 according to operational criteria set forth by the MTSO 110. It would be evident therefore to an artisan with ordinary skill in the art that the aforementioned embodiments can be modified, reduced, or enhanced without departing from the scope and spirit of the claims described below. Accordingly, the reader is directed to the claims below for a fuller understanding of the breadth and scope of the present disclosure.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A network management system (NMS), comprising a network configuration element executable by a controller adapted to:
    identify for each of a plurality of wireless base terminals (WBTs) a resultant communication path to a mobile telephone switching office (MTSO) according to a plurality of performance characteristics and a delay injected into at least one of a plurality of alternative communication paths connecting combinations of the WBTs to the MTSO;
    arrange portions of the plurality of WBTs into a corresponding plurality of groups having first and second groups in the plurality of groups sharing at least one WBT; and
    select for the at least one WBT shared by the first and second groups its resultant communication path to the MTSO according to performance characteristics corresponding to differential delays calculated for alternative communication paths associated with combinations of WBTs in the first and second groups and the delay injected into the at least one of the plurality of alternative communication paths.

2. The NMS of claim 1, wherein the controller is adapted to identify for each of the WBTs a corresponding one or more alternative communication paths to the MTSO according to distances between the WBTs and the MTSO and the delay injected into the at least one of the plurality of alternative communication paths.

3. The NMS of claim 1, wherein the controller is adapted to select for each WBT in a select one of the plurality of groups its resultant communication path to the MTSO according to differential delays calculated for alternative communication paths associated with combinations of WBTs in the select one of the plurality of groups and the delay injected into at least one of said alternative communication paths.

4. The NMS of claim 1, wherein the delay injected into at least one of the alternative communication paths reduces a differential delay between at least two of the alternative communication paths connecting the WBTs to the MTSO.

5. The NMS of claim 1, wherein the controller is adapted to identify for each WBT in a select one of the plurality of groups one or more communication paths to the MTSO according to performance characteristics corresponding to differential delays, path delays, distortions, and delays injected into at least one of the alternative communication paths between combinations of WBTs of the select one of the plurality of groups and the MTSO.

6. The NMS of claim 5, wherein the differential delays, path delays, distortions, and the injected delay fall below first, second, third and fourth thresholds, respectively.

7. The NMS of claim 5, wherein the controller is adapted to select the resultant communication path to the MTSO for each WBT in the select one of the plurality of groups according to an aggregate delay calculated for the identified communication paths between each combination of WBTs in the select one of the plurality of groups and the MTSO.

8. The NMS of claim 7, wherein the controller is adapted to select the resultant communication path for each combination of WBTs in the select one of the plurality of groups according to a lowest of the aggregate delays calculated.

9. The NMS of claim 5, wherein the distortions comprise jitter calculated by the network configuration element for each of the alternative communication paths to the MTSO.

10. The NMS of claim 5, wherein one or more adjustable delay injectors (ADIs) are located between a plurality of network elements connecting the WBTs to the MTSO, and wherein the controller is adapted to provision a portion of the plurality of network elements and the ADIs with operating parameters for effectuating the resultant communication path determined for each of the WBTs.

11. The NMS of claim 10, wherein each network element comprises a router for transmitting messages to the MTSO according to a packet-switched protocol.

12. A non-transitory computer-readable storage medium in an Adjustable Delay Injector (ADI), wherein the ADI comprises a transceiver, a memory buffer and a controller coupled thereto, and wherein the storage medium comprises computer instructions for applying a delay to data transported in a communication path established between a select one of a plurality of wireless base terminals (WBTs) and a mobile telephone switching office (MTSO) to satisfy a desired differential delay with another communication path established between another WBT and the MTSO, wherein portions of the plurality of WBTs are arranged into a corresponding plurality of groups having first and second groups in the plurality of groups sharing at least one WBT, and wherein the at least one WBT shared by the first and second groups has its resultant communication path to the MTSO selected according to performance characteristics corresponding to differential delays calculated for alternative communication paths associated with combinations of WBTs in the first and second groups and the delay applied to data transported in the communication path established between the select one of the plurality of WBTs and the MTSO.

13. The non-transitory storage medium of claim 12, wherein said delay reduces a differential delay between at least two communication path alternatives between the WBTs and the MTSO.

14. The non-transitory storage medium of claim 12, wherein the storage medium comprises computer instructions for buffering according to the delay the data transported in the communication path.

15. The non-transitory storage medium of claim 12, comprising computer instructions for receiving from a Network Management System (NMS) a delay parameter corresponding to the applied delay.

16. A network element, comprising a controller element, wherein the controller element is a router, and wherein the controller element is adapted to receive provisioning information for effectuating in whole or in part a resultant communication path to a mobile telephone switching office (MTSO), wherein the network element is integrated with or is coupled to an Adjustable Delay Injector (ADI) that injects a delay in the resultant communication path, wherein said resultant communication path is determined from a plurality of communication path alternatives between a plurality of wireless base terminals (WBTs) and the MTSO that satisfy a desired differential delay threshold, wherein portions of the plurality of WBTs are arranged into a corresponding plurality of groups having first and second groups in the plurality of groups sharing at least one WBT, and wherein the at least one WBT shared by the first and second groups has its resultant communication path to the MTSO selected according to performance characteristics corresponding to differential delays calculated for alternative communication paths associated with combinations of WBTs in the first and second groups and the delay injected in the resultant communication path to the MTSO.

17. The network element of claim 16, wherein the controller element is adapted to transmit packet data to the MTSO according to a packet-switched protocol.

18. The network element of claim 16, wherein the resultant communication path is determined further according to at least one among path delays, distortions, and delays injected into at least one of the communication alternative paths.

19. The network element of claim 16, wherein the delay injected reduces a differential delay between the resultant communication path and one or more communication paths alternatives between the WBTs and the MTSO.

* * * * *